(12) United States Patent
Pielock et al.

(10) Patent No.: US 10,703,158 B2
(45) Date of Patent: Jul. 7, 2020

(54) AIR SPRING COVER

(71) Applicant: Continental Teves AG & Co. oHG, Frankfurt (DE)

(72) Inventors: Ralf Pielock, Essel (DE); Andreas Nessel, Isernhagen (DE); Susanne Tatter, Hannover (DE); Christian Schallmeier, Leutkirch (DE); Garrett Mark Pniewski, Bloomfield Hills, MI (US); Sunny Makkar, Troy, MI (US); Kranti Kiran Manga, Rochester Hills, MI (US)

(73) Assignee: Continental Teves AG & Co. oHG (DE)

( * ) Notice: Subject to any disclaimer, the term of this patent is extended or adjusted under 35 U.S.C. 154(b) by 99 days.

(21) Appl. No.: 16/089,647

(22) PCT Filed: Mar. 27, 2017

(86) PCT No.: PCT/EP2017/057218
§ 371 (c)(1),
(2) Date: Sep. 28, 2018

(87) PCT Pub. No.: WO2017/174390
PCT Pub. Date: Oct. 12, 2017

(65) Prior Publication Data
US 2020/0039309 A1 Feb. 6, 2020

Related U.S. Application Data

(60) Provisional application No. 62/318,279, filed on Apr. 5, 2016.

(30) Foreign Application Priority Data

Apr. 7, 2016 (DE) .......................... 10 2016 205 741

(51) Int. Cl.
B60G 11/27 (2006.01)

(52) U.S. Cl.
CPC ........ *B60G 11/27* (2013.01); *B60G 2204/126* (2013.01); *B60G 2204/20* (2013.01); *B60G 2204/4308* (2013.01)

(58) Field of Classification Search
CPC .............. B60G 11/27; B60G 2204/126; B60G 2204/20; B60G 2204/4308; F16F 9/0454; F16F 9/54
See application file for complete search history.

(56) References Cited

U.S. PATENT DOCUMENTS 6,648,110 B2 * 11/2003 Nakamura ................ F16F 9/38
188/322.12
7,011,301 B2 3/2006 Oldenettel
(Continued)

FOREIGN PATENT DOCUMENTS

CN 102821984 A 12/2012
DE 10347934 A1 6/2004
(Continued)

OTHER PUBLICATIONS

German Search Report for German Application No. 10 2016 205 741.3, dated Jan. 10, 2017, with partial translation—9 pages.
(Continued)

*Primary Examiner* — Darlene P Condra
(74) *Attorney, Agent, or Firm* — RatnerPrestia

(57) ABSTRACT

Air spring strut for a motor vehicle including an air spring with a shock absorber for spring-cushioning and damping oscillations of a motor vehicle running gear assembly. The air spring includes an air spring cover and an air spring piston. An air spring bellows made of elastomeric material is clamped air-tightly between the air spring cover and the air spring piston partially delimits a working space filled
(Continued)

with compressed air and, while forming a rolling fold, rolls on the air spring cover and/or the air spring piston. The air spring cover is embodied in two parts with a first cover part for receiving an absorber bearing and with a second cover part for fastening the air spring bellows. The first cover part is manufactured from metal and the second cover part is manufactured from plastic.

13 Claims, 3 Drawing Sheets

(56) References Cited

U.S. PATENT DOCUMENTS

| | | | | |
|---|---|---|---|---|
| 8,973,932 | B2* | 3/2015 | Pielock | F16F 9/049 |
| | | | | 280/124.157 |
| 2004/0130079 | A1* | 7/2004 | Gold | B60G 15/068 |
| | | | | 267/64.23 |
| 2010/0104228 | A1* | 4/2010 | Kaneko | B60G 15/06 |
| | | | | 384/420 |
| 2013/0009376 | A1* | 1/2013 | Kaneko | F16C 33/20 |
| | | | | 280/124.155 |
| 2018/0009283 | A1* | 1/2018 | Pniewski | B60G 15/12 |

FOREIGN PATENT DOCUMENTS

| | | |
|---|---|---|
| DE | 10320501 A1 | 11/2004 |
| DE | 102010038238 A1 | 4/2012 |
| DE | 102012200389 A1 | 7/2013 |
| DE | 102012002433 A1 | 8/2013 |
| DE | 102013212982 A1 | 6/2014 |
| EP | 1424506 A1 | 6/2004 |
| WO | 2008031649 A1 | 3/2008 |
| WO | 2016022539 A1 | 2/2016 |

OTHER PUBLICATIONS

International Search Report and Written Opinion for International Application No. PCT/EP2017/057218, dated Jun. 28, 2017—8 pages.

* cited by examiner

AIR SPRING COVER

CROSS REFERENCE TO RELATED APPLICATIONS

This application is the U.S. National Phase Application of PCT International Application No. PCT/EP2017/057218, filed Mar. 27, 2017, which claims priority to German Patent Application No. 10 2016 205 741.3, filed Apr. 7, 2016, and U.S. Provisional Patent Application No. 62/318,279 filed Apr. 5, 2016 the contents of such applications being incorporated by reference herein.

FIELD OF THE INVENTION

The invention relates to an air spring strut.

BACKGROUND OF THE INVENTION

An air spring strut is used for spring-cushioning and damping a motor vehicle running gear assembly relative to the motor vehicle body. In general, the air spring strut comprises an air spring and an integrated shock absorber. In this case, the air spring consists essentially of an air spring cover, an air spring piston and an air spring bellows clamped between them. The shock absorber arranged within the air spring is, on the one hand, connected to a wheel carrier and, on the other hand, is fastened or mounted via its piston rod to an absorber bearing in the air spring cover. The air spring cover is connected to the vehicle body, as a result of which the shock absorber forces act on the body via the air spring cover.

The air spring covers, which are usually embodied in one piece, are therefore manufactured from metal since they can better absorb the forces acting and have a long life. However, air spring covers manufactured from metal are subject to a large number of machining steps and forming processes. In order to meet the functional requirements, parts that are in some cases complex and require a large amount of machining are required, being made in a large number of manufacturing steps and giving rise to high costs.

To reduce weight, air spring covers can also be manufactured from plastic, although these are subject to flow processes at high temperatures. In order to be able to appropriately absorb the shock absorber forces acting on the air spring cover, embedded reinforcing rings are used, although these once again increase the production work and costs.

DE 102013212982 A1, incorporated by reference herein, discloses an air spring cover which is manufactured from two parts in order to reduce weight, wherein these parts are made from different metals.

SUMMARY OF THE INVENTION

An aspect of the invention is an improved air spring cover of an air spring strut, which cover is simple and economical to produce and is nevertheless sufficiently stable.

According to an aspect of the invention, an air spring strut for a motor vehicle is provided, wherein the air spring strut comprises an air spring with a shock absorber for spring-cushioning and damping oscillations of a motor vehicle running gear assembly. The air spring comprises an air spring cover and an air spring piston, wherein an air spring bellows made of elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from metal and the second cover part is manufactured from plastic.

It has been found that the air spring cover according to an aspect of the invention withstands the tension and compression forces of the shock absorber by means of the first cover part manufactured from metal, while the second cover part can be manufactured from plastic without the overall structure failing in continuous operation. The second cover part manufactured from plastic thus has the advantage of freedom in configuration in respect of effective air spring bellows guidance and air spring bellows clamping. The separation of the main functions of the air spring cover (introduction of force and bellows guidance) makes it possible to configure the different components better in respect of their tolerance ranges. Moreover, the air spring cover is distinguished by a simple configuration that does not involve expensive mechanical finish machining. The first cover part is subject to a stamping and bending process, wherein the second cover part can be injection-moulded in any desired shape. In this way, low-cost configuration of an air spring cover is achieved, said configuration being distinguished by the combination of components made of metal and plastic. Through the use of metal in the first cover part and the use of plastic, as far as possible in a small amount, in the second cover part, a very low overall weight combined with a high load-bearing capacity of the air spring strut is achieved.

According to a preferred embodiment, the first and the second cover part are of pot-shaped design, wherein the first cover part is inserted into the second cover part. The pot-shaped configuration of the first, metal cover part serves to receive an absorber bearing of a shock absorber and to transmit the tension and compression forces of the shock absorber directly into the motor vehicle body via the absorber bearing. Preferably, the bottoms of the first and the second cover part lie flat on one another. The bottoms are preferably concavely shaped. The compression forces of the shock absorber are transferred directly into the bottom of the first metal cover part via the bottom of the plastic second part resting flat upon it and are thus transmitted onwards into the motor vehicle body. In addition, it is advantageous for the direction of force that the respective side walls of the cover parts are preferably aligned perpendicularly to the bottoms. The second pot-shaped cover part is preferably configured in such a way that a rolling surface for the upper rolling fold of the air spring bellows is provided on the outer circumference and can be configured for advantageous guidance of the bellows.

In the manufacturing process for the air spring cover, the first cover part is advantageously produced by means of a deep-drawing or stamping/bending process, wherein the first cover part is preferably manufactured from steel or alternatively from aluminium, cast aluminium or a forging. By virtue of the fact that no complex undercuts are necessary, the second cover part is injection-moulded or extruded in a simple manner from plastic. The second cover part is preferably reinforced by glass fibres, whereby a higher load-bearing capacity of the second cover part combined with the minimum weight is achieved.

According to another preferred embodiment, a sealing element is arranged radially between the first and the second cover part. A pressure-tight connection between the first and the second cover part with respect to the internal pressure of the air spring is advantageously obtained by means of the sealing element. As a particularly preferred option, the sealing element is arranged in the region of an upper bending edge or a lower bending edge of the first cover part. In the assembly process, the sealing element is positioned either on the cylindrical surface of the first cover part or on the upper or lower bending edge of the first cover part. A combination of respective sealing elements on the upper and lower bending edges is likewise conceivable.

According to another preferred embodiment, a sleeve is arranged radially between the first and the second cover part. The sleeve is preferably manufactured from plastic. The sleeve is likewise preferably reinforced by glass fibres, whereby a higher load-bearing capacity combined with the minimum weight is achieved. As a particularly preferred option, the sealing element is arranged underneath the sleeve in the axial direction. Likewise as a particularly preferred option, the sealing element can be embodied as a vulcanized-on sealing lip on the sleeve, this facilitating the assembly process and nevertheless meeting the requirements as regards leak-tightness. In interaction with the sealing element, the sleeve leads to an enhanced sealing of the two cover parts relative to the working space of the air spring. The sleeve rests by means of the upper end on the upper bending edge of the first cover part. Assembly is advantageous if the sleeve is first of all pushed onto the first cover part, and the seal element is then pushed onto the first cover part and simultaneously positioned on the sleeve, wherein finally the second cover part is pushed onto the first cover part. The air spring cover can thereby be assembled from one direction of assembly, thereby eliminating repositioning during the assembly process.

According to another preferred embodiment, the second cover part has a recess for an additional spring at its end facing the air spring piston. As a particularly preferred option, the recess is embodied for an additional spring in the form of a separate additional spring pot, wherein the additional spring pot can preferably be manufactured from plastic or metal. If the first and the second cover part are of pot-shaped design and the respective bottoms rest completely flat on one another, the shock absorber force absorbed by the additional spring is transmitted via the second cover part directly into the first cover part manufactured from metal, thereby enabling the first cover part advantageously to transmit the forces into the motor vehicle body.

According to another preferred embodiment, the absorber bearing of the shock absorber is arranged in the first cover part. The pot shape means that the first cover part manufactured from metal is designed to receive the absorber bearing of the shock absorber and to be able to transmit the forces which are acting without the air spring cover failing. An upper rolling fold of the air spring bellows advantageously forms a universal joint at the level of the absorber bearing. As a result, significantly lower lateral forces act on the air spring strut, and the entire cardanic deflection of the air spring strut is smaller.

A closure cap is preferably arranged for sealing in the first cover part, above the absorber bearing. The closure cap is preferably manufactured from a plastic. Moreover, the closure cap is preferably secured on the first cover part by means of a washer and a retaining ring or a circlip that can be pressed in. As a particularly preferred option, an elastomeric sealing element can be arranged above the washer and the closure cap. By means of these design features, the working space of the air spring bellows is sealed off from the outside, wherein the working space can be filled with air via an air connection in the closure cap. The washer can advantageously be pressed into engagement with the first cover part by means of a retaining ring, thereby making it possible to dispense with a production step for producing a groove in the first cover part.

A further sealing element is likewise preferably arranged radially between the first cover part and the closure cap. The further sealing element is preferably embodied as a vulcanized-on sealing lip on the closure cap. The air spring filled with compressed air is thereby reliably sealed. The closure cap preferably has an air connection for filling the air spring.

According to another preferred embodiment, the first and the second cover part are secured by means of an adhesive or by means of a press fit or positive engagement in order to secure the first and the second cover part against rotation relative to one another. The security against rotation can preferably be ensured by means of an axial positive engagement between the first cover part and at least one fastening element, wherein the fastening element is arranged between a folded-over surface of the upper bending edge of the first cover part and the second cover part. In this case, an annular bead is advantageously formed on a bearing surface of the fastening element, said annular bead pressing into the underside of the folded-over surface of the first cover part. Security against rotation is necessary to ensure that the two cover parts are not displaced during operation and that failure of the air spring strut does not occur.

The air spring strut is used in a running gear assembly, preferably in an air spring system, for a motor vehicle.

BRIEF DESCRIPTION OF THE DRAWINGS

Further preferred embodiments of aspects of the invention will become apparent from the dependent claims and the following description of illustrative embodiments by means of the figures.

Of the figures.

DETAILED DESCRIPTION OF THE PREFERRED EMBODIMENTS

Figure 1:
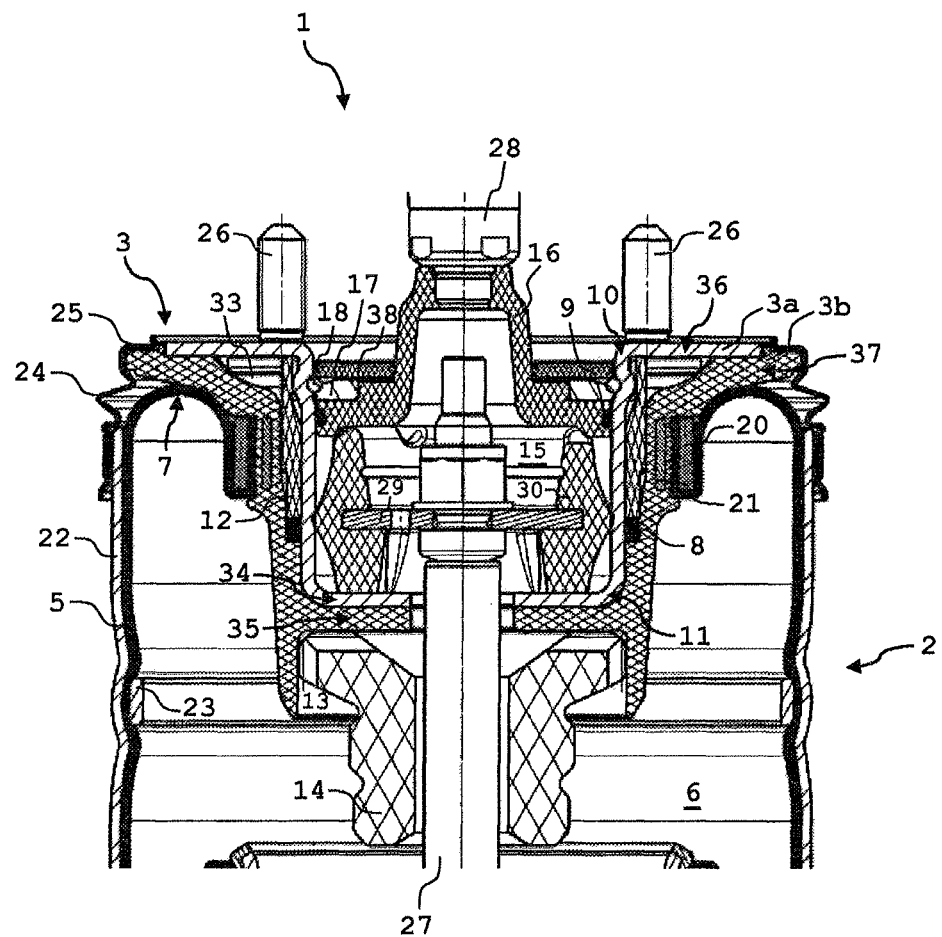
FIG. 1 shows a first illustrative air spring cover.

FIG. 1 shows a cutaway section of an air spring strut 1 having an illustrative air spring cover 3. The air spring strut 1 shown in part comprises an air spring 2 and the piston rod 27 of an integrated shock absorber (not shown in detail). Air spring 2 comprises an air spring cover 3, an air spring piston (not shown in detail) and an air spring bellows 5 clamped therebetween. Air spring bellows 5 partially comprises a working space 6, and a sleeve-shaped formation 22 is fixed on the air spring bellows 5 by means of an internal clamping ring 23.

Air spring cover 3 is of two-part design with a first cover part 3a and a second cover part 3b, wherein the first cover part 3a is manufactured from metal and the second cover part 3b is manufactured from plastic. The first and the second cover part 3a, 3b are of pot-shaped design, wherein the first cover part 3a is inserted into the second cover part 3b. The first cover part 3a comprises an upper bending edge 10 and a lower bending edge 11. The second cover part 3b is formed around the first cover part 3a and rests in a corresponding manner on the lower bending edge 11, for example. In this arrangement, the bottoms 34, 35 of the cover parts 3a, 3b rest completely flat on one another, wherein it is also possible for the bottoms 34, 35 to be concavely shaped. To secure the two cover parts 3a, 3b against relative rotation, they can be adhesively bonded, or the tolerance fields of the two cover parts 3a, 3b are designed for a press fit. The two cover parts 3a, 3b can also be secured by positive engagement using shaped features.

Sleeve 12 and sealing element 8 are arranged in a radial alignment relative to the longitudinal axis of the air spring strut 1, between the first and the second cover part 3a, 3b, wherein sealing element 8 is positioned below or in an axial direction relative to the sleeve 12 on a projection of the second cover part 3b. A burr-free annular groove for the sealing element 8 is thus obtained. Sleeve 12 extends to below the first cover part 3a. By means of sealing element 8 and sleeve 12, a pressure-tight connection between the two cover parts 3a, 3b with respect to the internal pressure of the working space 6 of the air spring 2 is obtained.

The first and the second cover part 3a, 3b each have a recess or through-hole for piston rod 27 in the bottom 34, 35. Piston rod 27 of the shock absorber is supported in the first cover part 3a by means of an absorber bearing 15. More specifically, piston rod 27 is supported by means of damping element 30 with supporting washer 29, wherein damping element 30 is seated in the first cover part 3a and piston rod 27 is fixed on the supporting washer 29. Supporting washer 29 has one or more openings for air to flow through.

Closure cap 16 seals the working space 6 of the air spring bellows 5 on the first cover part 3a above the absorber bearing 15. In this case, a further sealing element 9 is provided radially between the first cover part 3a and closure cap 16. Closure cap 16 is fastened to the first cover part 3a by means of a washer 17, made from metal for example, and a retaining ring 18, wherein a further elastomeric sealing element 38 rests above the washer 17 and the closure cap 16. Closure cap 16 has an air connection 28 for the connection of the air spring strut 1 to an air spring system. By means of air connection 28, air is passed via the openings in the supporting washer 29 and the through-holes in the first and the second cover part 3a, 3b into the working space 6 of the spring bellows 5 along the piston rod 27.

The second cover part 3b has a recess 13 for an additional spring 14 on its end facing the air spring piston. During inward deflection, the air spring piston or shock absorber moves towards the air spring cover, and therefore the additional spring 14 arranged in recess 13 serves as a travel limiter and damps possible forces acting on the air spring cover 3.

The first cover part 3a serves to accommodate the absorber bearing 15 and is therefore designed in such a way that tension and compression forces of the shock absorber can be absorbed. The shock absorber tension forces are passed into the first cover part 3a and thus onwards into the vehicle body directly via absorber bearing 15. The shock absorber compression forces are passed into the first cover part 3a and thus onwards into the vehicle body directly via the second cover part 3b. Air spring bellows 5 is fastened on the second cover part 3b and rolls on a rolling surface of the cover part 3b while forming an upper rolling fold 7.

Thus, the second cover part 3b is designed so that it meets the requirements as regards guidance of the air spring bellows.

The second cover part 3b has a receptacle 25 for fastening a folding bellows 24, wherein folding bellows 24 is fastened on the upper end of the outer guide 22. By means of folding bellows 24, the upper rolling fold 7 of the air spring bellows 5 is protected from soiling.

Air spring bellows 5 is fastened sealingly by its upper end on the second cover part 3b by means of clamping ring 20.

A reinforcing ring 21 is inserted in the second cover part 3b at a level where air spring bellows 5 is fastened by means of clamping ring 20. By means of reinforcing ring 21, the fastening of air spring bellows 5 by clamping ring 20 is reinforced, and greater leak-tightness is thus achieved.

Air spring cover 3 has one or more fastening elements 26 for fastening on a vehicle body. These are arranged between the folded-over surfaces 36, 37 of the respective upper bending edge of the first and the second cover part 3a, 3b. On the upper side of the folded-over surface 37, the second cover part 3b has a corresponding recess 33, wherein the first cover part 3a has corresponding through-holes for the fastening element 26 in the folded-over surface 36. A bearing surface of the fastening element 26 rests on the lower side of the folded-over surface of the first cover part 3a. Air spring cover 3 can thus be secured or screwed to the vehicle body by means of bolts, for example.

Figure 2:
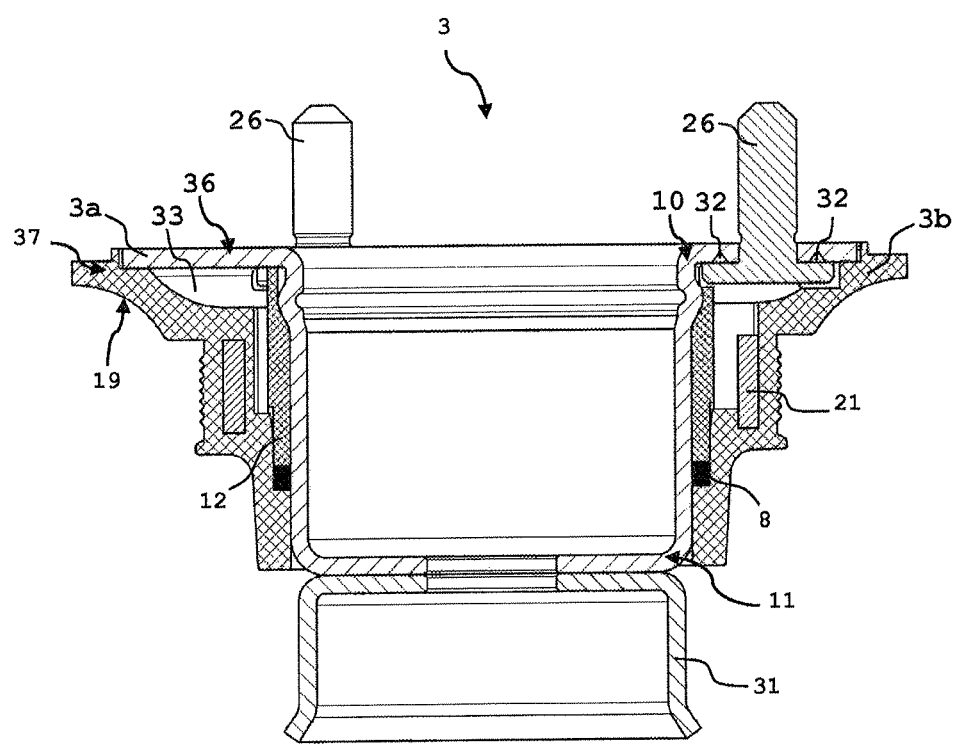
FIG. 2 shows a second illustrative air spring cover.

FIG. 2 shows a second illustrative air spring cover 3, which largely corresponds to the air spring cover in FIG. 1 and is distinguished by the fact that the recess for the additional spring is designed as a separate additional spring pot 31 on that end of the second cover part 3b which faces the air spring piston, wherein additional spring pot 31 can be manufactured from plastic or metal and the additional spring can be arranged in additional spring pot 31. Additional spring pot 31 likewise has a recess or through-hole for the piston rod of the shock absorber. As regards the forces absorbed by the additional spring, the additional spring pot 31 manufactured from metal is advantageous since it can absorb higher forces and can transmit them into the first cover part 3a.

To secure the two cover parts 3a, 3b against rotation relative to one another, axial positive engagement is produced between the first cover part 3a and one or more fastening elements 26. In this case, an encircling annular bead 32 is provided on the bearing surface of the fastening element 26, said annular bead being welded into the underside of the folded-over surface 36 of the first cover part 3a. Alternatively, fastening elements 26 can be implemented by means of knurled screws.

The second cover part 3b likewise has the rolling surface 19 for the upper rolling fold of the air spring bellows, which acts as a universal joint.

Figure 3:
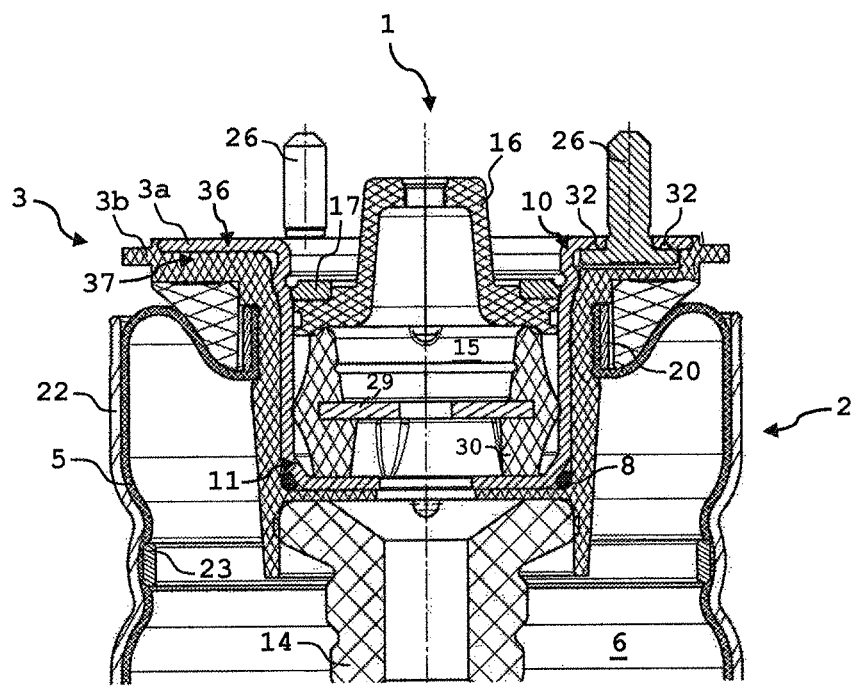
FIG. 3 shows a third illustrative air spring cover and
FIG. 4 shows a fourth illustrative air spring cover.

FIG. 3 shows a cutaway section of an air spring strut 1 having a third illustrative air spring cover 3. Air spring cover 3 is of two-part design with a first cover part 3a and a second cover part 3b, wherein the first and the second cover part 3a, 3b are of pot-shaped design and the first cover part 3a is inserted into the second cover part 3b. The first cover part 3a comprises an upper bending edge 10 and a lower bending edge 11.

Sealing element 8 is arranged on a lower bending edge 11 of the first cover part 3a, between the first and the second cover part 3a, 3b. By means of sealing element 8, a pressure-tight connection between the two cover parts 3a, 3b with respect to the internal pressure of the working space 6 of air spring 2 is obtained.

Figure 4:
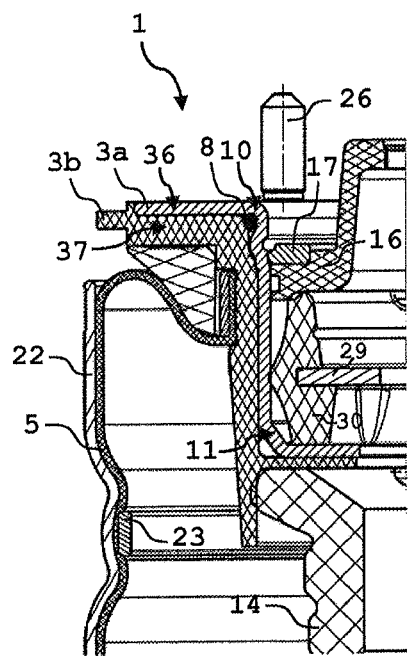

FIG. 4 shows the left-hand half of a section through a fourth illustrative air spring cover 3, the only difference with respect to FIG. 3 being that the sealing element 8 is arranged on an upper bending edge 10 of the first cover part 3a, between the first and the second cover part 3a, 3b. A pressure-tight connection is thus likewise obtained.

LIST OF REFERENCE SIGNS 1 air spring strut
2 air spring 3 air spring cover
3a first cover part
3b second cover part
4 air spring piston
5 air spring bellows
6 working space
7 rolling fold
8 sealing element
9 sealing element
10 upper bending edge
11 lower bending edge
12 sleeve
13 recess
14 additional spring
15 absorber bearing
16 closure cap
17 washer
18 retaining ring
19 rolling surface
20 clamping ring
21 reinforcing ring
22 outer guide
23 internal clamping ring
24 folding bellows
25 receptacle
26 fastening element
27 piston rod
28 air connection
29 supporting washer
30 damping element
31 additional spring pot
32 annular bead
33 recess
34 bottom
35 bottom
36 folded-over surface
37 folded-over surface
38 sealing element

The invention claimed is:

1. An air spring strut for a motor vehicle comprising an air spring with a shock absorber for spring-cushioning and damping oscillations of a motor vehicle running gear assembly, wherein the air spring comprises an air spring cover and an air spring piston, wherein an air spring bellows made of an elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from a metal and the second cover part is manufactured from a plastic, wherein the first and the second cover part are of pot-shaped design, and wherein the first cover part is inserted into the second cover part.

2. The air spring strut according to claim 1, wherein concavely shaped bottoms of the first and the second cover part lie flat on one another.

3. The air spring strut according to claim 1, wherein a sealing element is arranged radially between the first and the second cover part.

4. The air spring strut according to claim 3, wherein the sealing element is arranged in the region of an upper or a lower bending edge of the first cover part.

5. The air spring strut according to claim 1, wherein the absorber bearing of the shock absorber is arranged in the first cover part.

6. The air spring strut according to claim 1, wherein the first and the second cover part are secured by an adhesive or by a press fit or positive engagement in order to secure the first and the second cover part against rotation relative to one another.

7. An air spring strut for a motor vehicle comprising an air spring with a shock absorber for spring-cushioning and damping oscillations of a motor vehicle running gear assembly, wherein the air spring comprises an air spring cover and an air spring piston, wherein an air spring bellows made of an elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from a metal and the second cover part is manufactured from a plastic, and wherein a sleeve is arranged radially between the first and the second cover part.

8. The air spring strut according to claim 7, wherein a sealing element is arranged radially between the first and the second cover part and wherein the sealing element is arranged underneath the sleeve.

9. An air spring strut for a motor vehicle comprising an air spring with a shock absorber for spring-cushioning and damping oscillations of a motor vehicle running gear assembly, wherein the air spring comprises an air spring cover and an air spring piston, wherein an air spring bellows made of an elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from a metal and the second cover part is manufactured from a plastic, and wherein the second cover part has a recess for an additional spring at its end facing the air spring piston.

10. The air spring strut according to claim 9, wherein the recess is embodied as a separate additional spring pot manufactured from plastic or metal.

11. An air spring strut for a motor vehicle comprising an air spring with a shock absorber for spring-cushioning and damping oscillations of a motor vehicle running gear assembly, wherein the air spring comprises an air spring cover and an air spring piston, wherein an air spring bellows made of an elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from a metal and the second cover part is manufactured from a plastic, wherein the absorber bearing of the shock absorber is arranged in the first cover part, and wherein a closure cap is arranged for sealing on the first cover part, above the absorber bearing, wherein the closure cap is secured on the first cover part by a washer and a retaining ring that can be pressed in.

12. The air spring strut according to claim 11, wherein a further sealing element is arranged radially between the first cover part and the closure cap.

13. An air spring strut for a motor vehicle comprising an air spring with a shock absorber for spring-cushioning and damping oscillations of a motor vehicle running gear assembly, wherein the air spring comprises an air spring cover and an air spring piston, wherein an air spring bellows made of an elastomeric material clamped air-tightly between the air spring cover and the air spring piston partially delimits a working space filled with compressed air and, while forming a rolling fold, rolls on the air spring cover and/or the air spring piston, wherein the air spring cover is embodied in two parts with a first cover part for receiving an absorber bearing and with a second cover part for fastening the air spring bellows, wherein the first cover part is manufactured from a metal and the second cover part is manufactured from a plastic, and wherein there is axial positive engagement acting between the first cover part and at least one fastening element in order to secure the first and the second cover part against rotation relative to one another, wherein the fastening element is arranged between a folded-over surface of the upper bending edge of the first cover part and the second cover part.

* * * * *